United States Patent
Kanzaki et al.

(10) Patent No.: US 6,376,066 B1
(45) Date of Patent: Apr. 23, 2002

(54) TRANSPARENT ANTISTATIC LAYER-COATED SUBSTRATE AND OPTICAL ARTICLE

(75) Inventors: Fumiaki Kanzaki; Kazunobu Sato, both of Kanagawa-ken (JP)

(73) Assignees: Mitsubishi Gas Chemical Company Inc.; Japan Acryace Corporation, both of Tokyo (JP)

( * ) Notice: Subject to any disclaimer, the term of this patent is extended or adjusted under 35 U.S.C. 154(b) by 0 days.

(21) Appl. No.: 09/417,361

(22) Filed: Oct. 13, 1999

(30) Foreign Application Priority Data

Oct. 14, 1998 (JP) ............................................. 10-292206

(51) Int. Cl.$^7$ ......................... B32B 27/08; B32B 27/30; C08L 33/08; C08L 33/10
(52) U.S. Cl. ...................... 428/336; 428/216; 428/520; 428/521; 428/522; 428/922
(58) Field of Search ................................ 428/520, 522, 428/521, 922, 215, 216, 336; 252/519.5, 519.51; 524/409, 410, 910

(56) References Cited

U.S. PATENT DOCUMENTS 5,834,549 A * 11/1998 Suezaki et al. ............. 524/409
5,906,679 A * 5/1999 Watanabe et al. ........ 106/286.6

\* cited by examiner

Primary Examiner—D. S. Nakarani
(74) Attorney, Agent, or Firm—Antonelli, Terry, Stout & Kraus, LLP

(57) ABSTRACT

A transparent antistatic layer-coated substrate comprising a transparent substrate and an antistatic layer which comprises 20 to 70% by weight of conductive zinc antimonate and is disposed on at least one face of the transparent substrate, and an optical article comprising the transparent antistatic layer-coated substrate and a thin layer which comprises a fluorine compound having hydroxyl group and is disposed on the coated substrate. The antistatic layer is formed by photo-curing a composition comprising a photocurable material comprising a (meth)acrylate having at least one hydroxyl group and two or more (meth)acryloyl groups in a molecule, conductive zinc antimonate and a photopolymerization initiator.

The transparent antistatic layer-coated substrate and the optical article have excellent transparency, antistatic property, hardness and chemical resistance, show no deterioration in the transparency or the antistatic property in the condition of a high temperature and a high humidity and are advantageously used as a display material and a cover material at the front face of display apparatuses, a front panel of projection televisions, a cover material of instruments, a wall material of clean rooms and a packaging material for semiconductors.

7 Claims, No Drawings

TRANSPARENT ANTISTATIC LAYER-COATED SUBSTRATE AND OPTICAL ARTICLE

BACKGROUND OF THE INVENTION

1. Field of the Invention

The present invention relates to a transparent antistatic layer-coated substrate which has excellent transparency, antistatic property, hardness and solvent resistance and shows no deterioration in the transparency or the antistatic property in the condition of a high temperature and a high humidity and an optical article comprising the laminate and a layer of suppressed reflection which is a thin layer comprising a fluorine compound having hydroxyl group and disposed on the laminate. The transparent antistatic layer-coated substrate and optical article of the present invention are advantageously used for a display material and a cover material at the front face of display apparatuses, a front panel of projection televisions, a cover material of instruments, a wall material of clean rooms and a packaging material for semiconductors.

2. Description of the Related Arts

Transparent substrates are widely used as light-transmitting materials for electric appliances and buildings and as covers for instruments. However, the transparent substrates have drawbacks in that surface properties such as hardness and chemical resistance are poor and that static electricity tends to be formed and accumulated although the substrates show excellent electric insulation. These drawbacks cause a problem in that, due to dusts and other contaminating substances attracted by the electrostatic force of the formed electrostatic charge, transparency and gloss decrease and appearance becomes poor to deteriorate the commercial value. In particular, front panels of CRT displays, LCD displays and projection televisions have a problem in that electrostatic charge tends to be formed on these panels and visibility of images is deteriorated by dusts and other contaminating substances attracted by the formed electrostatic force. The panels have another problem in that visibility of images is deteriorated by reflection of outside lights such as the sun light and fluorescent lights and also by reflection of outside images.

As the method for improving the antistatic property, a surfactant may be added to a panel material and mixed with it or the surface of a panel may be coated with a surfactant. However, these methods have drawbacks in that the effect of the improvement cannot be sustained for a long time and the effect is lost when the panel is wiped or washed with water. A sustained effect for improving the antistatic property can be obtained by coating a panel with a coating material containing an alkylene glycol having a double bond, a derivative thereof or a halogen compound such as alkylamine halides. However, this method has drawbacks in that the antistatic property markedly changes depending on the humidity and a sufficient antistatic property cannot be obtained in the condition of a low humidity and that detachment of the coating layer and formation of haze take place in the condition of a high temperature and a high humidity. To overcome the above problems, transparent coating materials containing conductive fine powder which contains tin oxide as the main component are disclosed in the specifications of Japanese Patent Application Laid-Open Nos. Showa 58(1983)-91777 and Showa 60(1985)-60166. In accordance with these methods, conductivity is not affected by the temperature and the humidity and remains stable due to the electronic conductive property of the formed coating layer. Detachment of the coating layer or formation of haze does not take place even in the condition of a high temperature and a high humidity and excellent hardness and solvent resistance can be maintained. However, in accordance with this method, the conductive fine powder must be incorporated into the coating layer in a great amount and this causes drawbacks in that transparency becomes poor and that cost of the coating material itself increases. As the method for preventing reflection of outside images to improve visibility of the images, a layer for preventing reflection which contains metal oxides may be formed in accordance with the vapor deposition process or the sputtering process, or a thin layer having a small refractive index which contains compounds having fluorine may be formed in accordance with the coating process. The method using the vapor deposition process or the sputtering process has drawbacks in that the mechanism of the apparatus allows application of the process only to relatively small articles and that cost of the application is great because of the batch process. The method using the coating process has drawbacks in that heat deformation of plastic substrates is inevitable due to the high temperature generally required for drying or curing the coating layer and that adhesion to a substrate or wear resistance is insufficient although relatively large articles can be coated and cost of the application can be reduced by adopting a continuous operation.

SUMMARY OF THE INVENTION

An object of the present innovation is to provide a transparent antistatic layer-coated substrate which has excellent transparency, antistatic property, hardness and solvent resistance and does not show deterioration in the transparency or the antistatic property in the condition of a high temperature and a high humidity, and an optical article showing suppressed reflection and excellent wear resistance.

As the result of extensive studies by the present inventors, it was found that the above object could be achieved by the present invention which is summarized in the following.

The present invention provides:

(1) A transparent antistatic layer-coated substrate comprising a transparent substrate and an antistatic layer which comprises 20 to 70% by weight of conductive zinc antimonate and is disposed on at least one face of the transparent substrate, wherein the antistatic layer is formed by photocuring a composition comprising (A) a photocurable material comprising a (meth)acrylate having at least one hydroxyl group and two or more (meth)acryloyl groups in a molecule, (B) conductive zinc antimonate and (C) a photopolymerization initiator;

(2) A transparent antistatic layer-coated substrate described in (1), wherein the (meth)acrylate having at least one hydroxyl group and two or more (meth)acryloyl groups in a molecule is an epoxy-based (meth)acrylate;

(3) A transparent antistatic layer-coated substrate described in (1), wherein the (meth)acrylate having at least one hydroxyl group and two or more (meth)acryloyl groups in a molecule is an epoxy-based (meth)acrylate having a refractive index of 1.54 or more (4) A transparent antistatic layer-coated substrate described in (1), wherein the transparent substrate comprises a copolymer of methyl methacrylate and styrene;

(5) A transparent antistatic layer-coated substrate described in (1), wherein the photopolymerization initiator is a compound derived from α-aminoacetophenone;

(6) A transparent antistatic layer-coated substrate described in (1), wherein the antistatic layer has a refractive index of 1.56 or more;

(7) A transparent antistatic layer-coated substrate described in (6), wherein a thickness d of the antistatic layer satisfies following equation (1):

$$d = 1/(4n_a) \times \lambda \times (2n+1) \quad (1)$$

wherein $n_a$ represents a refractive index of the antistatic layer, $\lambda$ represents a wave length used for designing the antistatic layer and is in a range of 530 to 570 nm and n represents 1 or 2; and (8) An optical article comprising a transparent antistatic laminate described in (7) and a thin layer which comprises a fluorine compound having hydroxyl group and is disposed on the laminate.

DESCRIPTION OF THE PREFERRED EMBODIMENTS

The transparent substrate used in the present invention may be any substrate made of a transparent resin or a transparent glass. Examples of the transparent resin include acrylic resins, copolymer resins of methyl methacrylate and styrene, polycarbonate resins, styrene resins, polyester resins and vinyl chloride resins. Among these resins, copolymer resins of methyl methacrylate and styrene are preferable from the standpoint of physical properties such as light transmittance, refractive index, water absorption and rigidity.

The (meth)acrylate having at least one hydroxyl group and two or more (meth)acryloyl groups in a molecule used for the photocurable material may be any (meth)acrylate having at least one hydroxyl group and at least two (meth) acryloyl groups in a molecule. Examples of said (meth) acrylate include urethane-based (meth)acrylates having hydroxyl group and epoxy-based (meth)acrylates having hydroxyl group.

Among these compounds, epoxy-based (meth)acrylates are preferably used. The epoxy-based (meth)acrylates can be obtained by reaction of a (meth)acrylate compound having an active hydrogen atom with a compound having two or more glycidyl groups in the molecule. Epoxy-based (meth) acrylates having a refractive index of 1.54 or more are more preferably used. When the refractive index is smaller than 1.54, the refractive index of the obtained antistatic layer is not sufficiently high and a problem is caused in that reflection is not sufficiently suppressed when a thin film comprising a fluorine compound having hydroxyl group is formed.

The photocurable material of component (A) may comprise the (meth)acrylate having at least one hydroxyl group and two or more (meth)acryloyl groups in a molecule alone or may comprise said (meth)acrylate and other components. Examples of the other components include difunctional (meth)acrylates such as ethylene glycol di(meth)acrylate, diethyleneglycol di(meth)acrylate, triethylene glycol di(meth)acrylate, tetraethylene glycol di(meth)acrylate, nonaethylene glycol di(meth)acrylate, polyethylene glycol di(meth)acrylate, tripropylene glycol di(meth)acrylate, tetrapropylene glycol di(meth)acrylate, nonapropylene glycol di(meth)acrylate, polypropylene glycol di(meth)acrylate, neopentyl glycol hydroxypivalate di(meth)acrylate, bisphenol A di(meth)acrylate, 1,6-hexanediol di(meth)acrylate, 2-ethyl-2-butylpropanediol di(meth)acrylate, 1,9-nonanediol di(meth)acrylate, hexyl 2,2-bis[4-(acryloxydiethoxy)-phenyl]propane, 2,2-bis[4-(methacryloxy-diethoxy)phenyl]propane, 3-phenoxy-2-propanoyl acrylate and 1,6-bis(3-acryloxy-2-hydroxypropyl) hexyl ether; trifunctional (meth)acrylates such as pentaerythritol tri(meth)acrylate, trimethylolpropane tri(meth)acrylate, glycerol tri(meth)acrylate and tris-(2-hydroxyethyl) isocyanurate (meth)acrylate; tetra- or more functional (meth)acrylates such as pentaerythritol tetra (meth)acrylate, dipentaerythritol penta(meth)acrylate and dipentaerythritol hexa(meth)acrylate; and urethane oligomers based on acrylates.

The (meth)acrylates having hydroxyl group show an excellent property to disperse conductive zinc antimonate. Therefore, transparency is improved by using the (meth) acrylate having hydroxyl group in the photocurable material. Adhesion to the fluorine compound having hydroxyl group is also improved because the (meth)acrylate has hydroxyl group.

The content of the (meth)acrylate having at least one hydroxyl group and two or more (meth)acryloyl groups in a molecule in the photocurable material of component (A) is 30 to 100% by weight and preferably 40 to 100% by weight. When the content of the (meth)acrylate is less than 30% by weight, transparency of the obtained transparent antistatic layer-coated substrate or adhesion between the transparent substrate and the antistatic layer becomes poor. Therefore, such a content is not preferable.

As the conductive zinc antimonate used in the present invention, for example, compounds obtained in accordance with the process disclosed in the specification of Japanese Patent Application Laid-Open No. Heisei 6(1994)-219743 may be used. In the above specification, the following processes are disclosed: a process for producing conductive zinc antimonate in which a zinc compound and a colloidal antimony oxide are mixed in relative amounts such that ratio by mol of ZnO to $Sb_2O_5$ is in the range of 0.8 to 1.2 and the obtained mixture is baked at 500 to 1100° C.; and a process for obtaining an zinc antimonate sol in water or in an organic solvent in which an alkylamine such as ethylamine, propylamine, isopropylamine and diisobutylamine, an alkanolamine such as triethanolamine and monoethanolamine, a diamine such as ethylenediamine or an oxycarboxylic acid such as lactic acid, tartaric acid, malic acid and citric acid is added to the above conductive zinc antimonate as a stabilizer, the mixture is wet pulverized and the zinc antimonate sol is obtained using water, or an organic solvent for example an alcohol such as methyl alcohol, ethyl alcohol, propyl alcohol, isopropyl alcohol and butyl alcohol, a glycol such as ethylene glycol, diethylene glycol and hexylene glycol, a cellosolve such as ethylcellosolve and propylcellosolve or an amide such as dimethylformaldehyde and dimethylacetaldehyde as a dispersion medium. A zinc antimonate sol in water or in an organic solvent obtained using zinc antimonate which has been treated with a silane coupling agent at the surface may also be used where desirable.

It is necessary that the conductive zinc antimonate be contained in the antistatic layer in an amount of 20 to 70% by weight and preferably 30 to 60% by weight. When the amount is less than 20% by weight, the obtained transparent antistatic layer-coated substrate has an insufficient antistatic property and adhesion with the fluorine compound having hydroxyl group decreases to cause insufficient wear resistance although the cause for the latter phenomenon has not been elucidated. When the amount exceeds 70% by weight, problems occur in that transparency deteriorates and haze is formed and that hardness and solvent resistance of the coating layer decrease.

The photopolymerization initiator used in the present invention is not particularly limited and any photopolymerization initiator which is sensitized by active light such as ultraviolet light and visible light and accelerates photocuring can be used. Examples of the photopolymerization initiator include sulfides such as sodium methyldithiocarbamate sulfide, diphenyl monosulfide and dibenzothiazoyl monosulfide and dibenzothiazoyl disulfide; thioxanthone derivatives such as thioxanthone, 2-ethylthioxanthone, 2-chlorothioxanthone and 2,4-diethylthioxanthone; azo compounds such as hydrazone and azobisisobutyronitrile; diazo compounds such as benzene diazonium salt; aromatic carbonyl compounds such as benzoin, benzoin methyl ether, benzoin ethyl ether, benzophenone, dimethylaminobenzophenone, 2,2-dimethoxy-1,2-diphenylethane-1-one, 1-hydroxycyclohexyl phenyl ketone, 2-hydroxy-2-methyl-1-phenylprop ane-1-one, 2-methyl-1 [4-(methylthio)phenyl]-2-morpholinopropanone-1,2-benzyl-2-dimethylamino-1-(4-morpholinophenyl)-butanone-1, 1-(4-(2-hydroxyethoxy)phenyl)-2-hydroxy-2-methyl-1-propane-1-one, Michler's ketone, benzyl-anthraquinone, t-butylanthraquinone, 2-methylanthraquinone, 2-ethylanthraquinone, 2-aminoanthraquinone and 2-chloroanthraquinone; dialkylaminobenzoic acid esters such as methyl p-dimethyaminobenzoate, ethyl p-dimethylaminobenzoate, butyl p-dimethylaminobenzoate and isopropyl p-dimethylaminobenzoate; peroxides such as benzoyl peroxide, di-t-butyl peroxide, dicumyl peroxide and cumene hydroperoxide; acridine derivatives such as 9-phenylacridine, 9-p-methoxyphenylacridine, 9-acetylaminoacridine and benzacridine; phenazine derivatives such as 9,10-dimethylbenzphenazine, 9-methylbenzphenazine and 10-methoxybenzphenazine; quinoxaline derivatives such as 6,4,4'-triemthoxy-2,3-diphenylquinoxaline; 2,4,5-triphenylimidazoyl dimers; 2-nitrofluorene; 2,4,6-triphenylpyrilinium tetrafluoroborate; 2,4,6-tris(trichloromethyl)-1,3,5-triazine, 3,3'-carbonylbiscoumarine and thio-Michler's ketone.

Among these photopolymerization initiators, compounds derived from an α-aminoalkylphenone such as 2-methyl-1-[4-(methylthio)phenyl]-2-monpholinopropanone-1,2-benzyl-2-dimethylamino- 1-(4-morpholinophenyl)-butanone-1 are preferable due to the high reactivity.

The amount of the photopolymerization initiator is preferably 0.1 to 15 parts by weight per 100 parts by weight of the photocurable material. When the amount is less than 0.1 parts by weight, polymerization of the material by photocuring does not proceed sufficiently and the obtained antistatic layer shows insufficient hardness and solvent resistance. When the amount exceeds 15 parts by weight, the sensitivity does not increase to the extent expected from the amount and there is the possibility that heat resistance and hardness of the antistatic layer deteriorate.

The antistatic layer of the present invention is formed by applying the antistatic composition comprising (A) the photocurable material, (B) the conductive zinc antimonate and (C) the photopolymerization initiator to the transparent substrate in accordance with a conventional coating method such as spray coating, dip coating, curtain flow coating, roll coating and gravure coating, followed by curing by irradiation of ultraviolet light, visible light, radiation or by heat accompanied by the irradiation. When the antistatic layer is formed, various additives such as organic solvents, ultraviolet light absorbents, antioxidants, thermal polymerization inhibitors, leveling agents and defoaming agents may be added to the above antistatic composition, where necessary, to improve dispersion of the conductive zinc antimonate and to adjust thickness of the layer.

Examples of the organic solvent include methanol, ethanol, isopropyl alcohol, butyl alcohol, cyclohexanol, methyl ethyl ketone, methyl isobutyl ketone, cyclohexanone, ethylene glycol monomethyl ether (methylcellosolve), ethylene glycol monomethyl ether (ethylcellosolve), propylene glycol monomethyl ether, diethylene glycol dimethyl ether, ethyl acetate and butyl acetate. Among these organic solvents, organic solvents having hydroxyl group or carbonyl group are preferable from the standpoint of dispersion of the conductive zinc antimonate.

The greater the refractive index of the antistatic layer, the more suppressed the reflection after the thin layer comprising a fluorine compound having hydroxyl group has been disposed. Therefore, it is preferable that the refractive index is 1.56 or more. When the refractive index is less than 1.56, reflection is not sufficiently suppressed.

It is preferable that the thickness of the antistatic layer of the present invention is adjusted in the range of $0.2 \times 10^3$ to $5 \times 10^3$ nm. When the thickness is less than $0.2 \times 10^3$ nm, a sufficient hardness is not obtained and solvent resistance deteriorates. When the thickness exceeds $5 \times 10^3$, transparency deteriorates.

When the thin film comprising a fluorine compound having hydroxyl group is disposed on the transparent antistatic layer-coated substrate of the present invention, it is preferable that the thickness d of the antistatic layer satisfies the following equation (1):

$$d = 1/(4n_a) \times \lambda \times (2n+1) \tag{1}$$

wherein $n_a$ represents a refractive index of the antistatic layer, $\lambda$ represents a wave length used for designing the antistatic layer and is in a range of 530 to 570 nm and n represents 1 or 2.

When the thickness d is different from the value obtained in accordance with equation (1), a problem arises in that reflection is not sufficiently suppressed when the thin layer comprising a fluorine compound having hydroxyl group is disposed on the layer. The fluorine compound having hydroxyl group used in the present invention is not particularly limited as long as the compound has a refractive index of 1.42 or less. It is preferable that the fluorine compound is dissolved in an organic solvent. n in equation (1) is preferably 1. It is preferable that the thickness of the layer comprising the fluorine compound having hydroxyl group is 70 to 110 nm. When the thickness is outside the above range, reflection is not sufficiently suppressed.

To summarize the advantages of the present invention, the transparent antistatic layer-coated substrate has excellent transparency, antistatic property, hardness and solvent resistance and, in particular, shows no decrease in the transparency or the antistatic property even in the condition of a high temperature and a high humidity. Taking advantage of these properties, the transparent antistatic layer-coated substrate is advantageously used for applications such as a display material and a cover material at the front face of display apparatuses, a front panel of projection televisions, a cover material of instruments, a wall material of clean rooms and a packaging material for semiconductors. The optical article of the present invention has excellent transparency, antistatic property and chemical resistance due to the transparent antistatic layer-coated substrate and the thin layer comprising a fluorine compound having hydroxyl group disposed on the laminate. In particular, the optical article shows no decrease in the transparency and the antistatic property even in the condition of a high temperature and a high humidity and shows suppressed reflection and excellent visibility and wear resistance. Therefore, the optical article is advantageously used as a display material and a cover material at the front face of display apparatuses, a front panel of projection televisions, a cover material of instruments, a wall material of clean rooms and a packaging material for semiconductors.

EXAMPLES

The present invention will be described more specifically with reference to examples in the following.

The evaluations were made in accordance with the following methods:

[1] Hardness: The hardness was measured in accordance with the method of Japanese Industrial Standard K5400 using a pencil hardness tester manufactured by TOYO SEIKI SEISAKUSHO Co., Ltd.

[2] Solvent resistance: A test piece of a prepared transparent antistatic layer-coated substrate was dipped into methyl isobutyl ketone for 5 minutes and the chemical resistance was evaluated by visual observation of the test piece. When the test piece was in a good condition without change in the appearance after the dipping, the chemical resistance was evaluated as good. When cracks and hazes were found in the test piece after the dipping, the solvent resistance was evaluated as poor.

[3] Adhesion: The adhesion was evaluated in accordance with the method of Japanese Industrial Standard K5400. Eleven linear cuts separated by 1 mm from each other were made in the longitudinal and transverse directions on a film coating the surface of a test piece by a razor blade to form a grid having 100 separate portions. A commercial plastic pressure-sensitive adhesive tape was attached well to the surface on which the grid was formed and then peeled rapidly in the direction perpendicular to the surface. The number X of portions remained on the surface was counted. The adhesion was expressed by X/100.

[4] Total light transmittance and haze value: The total light transmittance and the haze value were evaluated in accordance with the method of Japanese Industrial Standard K7105 using an apparatus for measuring color difference and turbidity, model No. COH-300A, manufactured by NIPPON DENSHOKU KOGYO Co., Ltd.

[5] Surface resistance: The surface resistance was measured in accordance with the method of Japanese Industrial Standard K6911 using a digital instrument for measuring ultra-high resistance and ultra-small electric current R-12704 manufactured by ADVANTEST Co., Ltd. The unit of the surface resistance is ohm (Ω).

[6] Thickness of a layer: The thickness of a layer was measured using a spectrophotometer TV3100PC manufactured by SHIMADZU SEISAKUSHO Co., Ltd., in the wave length region of 340 to 1,000 nm. [7] Wear resistance: A gauze was folded into a piece of 10 layers and the formed piece was attached to a tip of a rubber rod having a diameter of 6.4 mm. The piece of gauze was pushed to the surface of a coating layer of a sample by a weight of 1.6 kg and reciprocally moved repeatedly 100 times. After the treatment, the appearance of the surface was visually observed. When no damages were found on the surface, the wear resistance was expressed as good. When any damages were found, the wear resistance was expressed as poor.

[8] Reflection: The reflection of a sample was measured at a wave length of 550 nm using a spectrophotometer UV3100PC manufactured by SHIMADZU SEISAKUSHO Co., Ltd. The face of the sample opposite to the face of measurement was made rough by a sand paper and coated with a black coating material to prevent reflection at the opposite face.

(1) Preparation of Antistatic Resin Composition 1

A conductive zinc antimonate sol (trade name: CELNAX CX-Z200IP Modification 3; diameter of primary particles as measured in accordance with the BET method: 20 nm; diameter of secondary particles as measured in accordance with the dynamic light scattering method: 222 nm; solid components/isopropyl alcohol=20%/80% by weight; manufactured by NISSAN KAGAKU KOGYO CO., Ltd.) in an amount of 150 parts by weight, 70 parts by weight of epoxy-based acrylate coating material 1 of the ultraviolet light curing type (trade name: UNIDIC V-5502; epoxy-based acrylate/trimethylolpropane triacrylate=40%/60% by weight; manufactured by DAINIPPON INK KAGAKU KOGYO Co., Ltd.), 6 parts by weight of photopolymerization initiator 1 (trade name: IRGACURE 907; manufactured by CIBA SPECIALTY CHEMICALS Co., Ltd.; chemical name: 2-methyl-1-[4-(methylthio)phenyl]-2-morpholinopropane-1) and 780 parts by weight of ethylcellosolve were mixed together and dispersed to prepare antistatic resin composition 1.

(2) Preparation of Antistatic Resin Compositions 2, 3 and 8

The conductive zinc antimonate sol, epoxy-based acrylate coating material 1 of the ultraviolet light curing type, photopolymerization initiator 1 and ethylcellosolve which were used for preparation of antistatic resin composition 1 were mixed together in amounts shown in Tables 1 and 2 to prepare antistatic resin compositions 2, 3 and 8.

(3) Preparation of Antistatic Resin Compositions 4 and 7

The conductive zinc antimonate sol, epoxy-based acrylate coating material 1 of the ultraviolet light curing type, photopolymerization initiator 1 and ethylcellosolve which were used for preparation of antistatic resin composition 1 and trimethylpropane triacrylate were mixed together in amounts shown in Tables 1 and 2 to prepare antistatic resin compositions 4 and 7.

(4) Preparation of Antistatic Resin Composition 5

Epoxy-based acrylate coating material 2 of ultraviolet light curing type (trade name: UNIDIC V-5500; epoxy-based acrylate=100% by weight; manufactured by DAINIPPON INK KAGAKU KOGYO Co., Ltd.) and the conductive zinc antimonate sol, photopolymerization initiator 1 and ethylcellosolve which were used for preparation of antistatic resin composition 1 were mixed together in amounts shown in Table 1 to prepare antistatic resin composition 5.

(5) Preparation of Antistatic Resin Composition 6

The conductive zinc antimonate sol, epoxy-based acrylate coating material 1 of the ultraviolet light curing type, photopolymerization initiator 1 and ethylcellosolve which were used for preparation of antistatic resin composition 1 and 1-butanol were mixed together in amounts shown in Table 1 to prepare antistatic resin composition 6.

(6) Preparation of Antistatic Resin Compositions 9 and 10

Commercial conductive tin oxide sol 1 (trade name: ELCOM W-85; solid components/isopropyl alcohol=30%/70% by weight; manufactured by SHOKUBAI KASEI KOGYO Co., Ltd.), urethane-based acrylate coating material 1 of the ultraviolet curing type (trade name: OLESTAR RA1353; effective components/ethyl acetate=80%/20% by weight; manufactured by MITSUI KAGAKU Co., Ltd.), photopolymerization initiator 1 and ethylcellosolve which were used for preparation of antistatic resin composition 1 were mixed together in amounts shown in Table 2 and 3 to prepare antistatic resin compositions 9 and 10.

(7) Preparation of Antistatic Resin Composition 11

A commercial sol containing titanium oxide (trade name: SUN COLLOID HIT-30M; solid components/methanol=

30%/70% by weight; manufactured by NISSAN KAGAKU KOGYO Co., Ltd.), 1-butanol and epoxy-based acrylate coating material 1, photopolymerization initiator 1 and ethylcellosolve which were used for preparation of antistatic resin composition 1 were mixed together in amounts shown in Table 3 to prepare antistatic resin composition 11.

(8) Preparation of Antistatic Resin Composition 12

Commercial conductive tin oxide sol 2 (trade name: SN100P; solid components/isopropyl alcohol=30%/70% by weight; manufactured by ISHIHARA SANGYO CO., Ltd.), 1-butanol and epoxy-based acrylate coating material 1, photopolymerization initiator 1 and ethylcellosolve which were used for preparation of antistatic resin composition 1 were mixed together in amounts shown in Table 3 to prepare an antistatic resin composition 12.

TABLE 1

| Antistatic resin composition | 1 | 2 | 3 | 4 | 5 | 6 |
|---|---|---|---|---|---|---|
| Composition of coating material (parts by weight) | | | | | | |
| epoxy-based acrylate coating material 1 | 70 | 60 | 30 | 60 | — | 40 |
| epoxy-based acrylate coating material 2 | — | — | — | — | 40 | — |
| TMPT | — | — | — | 20 | — | — |
| conductive zinc antimonate sol | 150 | 200 | 350 | 100 | 300 | 300 |
| photopolymerization initiator 1 | 6 | 5 | 2 | 5 | 3 | 3 |
| ethylcellosolve | 780 | 740 | 620 | 820 | 660 | 180 |
| 1-butanol | — | — | — | — | — | 480 |
| Amount of solid components (% by weight) | | | | | | |
| photocurable material | 70 | 60 | 30 | 80 | 40 | 40 |
| conductive zinc antimonate | 30 | 40 | 70 | 20 | 60 | 60 |
| Refractive index of solid component | 1.53 | 1.54 | 1.59 | 1.51 | 1.60 | 1.57 |

Note TMPT: trimethylolpropane triacrylate

TABLE 2

| Antistatic resin composition | 7 | 8 | 9 |
|---|---|---|---|
| Composition of coating material (parts by weight) | | | |
| epoxy-based acrylate coating material 1 | 68 | 20 | — |
| urethane-based acrylate coating material 1 | — | — | 63 |
| TMPT | 17 | — | — |
| conductive zinc antimonate sol | 75 | 400 | — |
| conductive tin oxide sol 1 | — | — | 167 |
| photopolymerization initiator 1 | 7 | 2 | 4 |
| ethylcellosolve | 840 | 580 | 770 |
| 1-butanol | — | — | — |
| Amount of solid components (% by weight) | | | |
| photocurable material | 85 | 20 | 50 |
| conductive zinc antimonate | 15 | 80 | 50 |
| Refractive index of solid component | 1.51 | 1.61 | 1.56 |

Note TMPT: trimethylolpropane triacrylate

TABLE 3

| Antistatic resin composition | 10 | 11 | 12 |
|---|---|---|---|
| Composition of coating material (parts by weight) | | | |
| epoxy-based acrylate coating material 1 | — | 40 | 40 |
| urethane-based acrylate coating material 1 | 50 | — | — |
| TMPT | — | — | — |
| conductive zinc antimonate sol | — | — | — |
| sol containing titanium oxide | — | 200 | — |
| conductive tin oxide sol 1 | 200 | — | — |
| conductive tin oxide sol 2 | — | — | 200 |
| photopolymerization initiator 1 | 3 | 3 | 3 |
| ethylcellosolve | 750 | 380 | 380 |
| 1-butanol | — | 1380 | 1380 |
| Amount of solid components (% by weight) | | | |
| photocurable material | 40 | 40 | 40 |
| conductive zinc antimonate | 60 | 60 | 60 |
| Refractive index of solid component | 1.58 | 1.60 | 1.59 |

Note TMPT: trimethylolpropane triacrylate

Example 1

Both faces of a transparent sheet of a copolymer of methyl methacrylate and styrene having a thickness of 2.0 mm (trade name: ACRYACE MS; manufactured by JAPAN ACRYACE Co., Ltd.) were coated with antistatic resin composition 1 in accordance with the curtain flow coating process in a manner such that a coating layer having a thickness of 1,000 to 3,000 nm was formed on each face after being dried. The applied composition was dried at the room temperature for 30 minutes. The obtained coating layers were cured by irradiation of ultraviolet light of 1.0 J/cm$^2$ using a metal halide lamp. Physical properties of the obtained transparent antistatic layer-coated substrate were measured after the coated substrate was prepared and after a test in the condition of a high temperature and a high humidity. In the test in the condition of a high temperature and a high humidity, the coated substrate was left standing in the environment at a temperature of 60° C. and a humidity of 95% for one week. The results of the evaluation are shown in Table 4.

Examples 2 to 5 and Comparative Examples 1 and 2

The same procedures as those conducted in Example 1 were conducted except that antistatic resin compositions 2 to 5, 7 and 8 were used in place of antistatic resin composition 1. The results of the evaluation are shown in Tables 4 and 5.

Examples 6

The same procedures as those conducted in Example 1 were conducted except that antistatic resin composition 6 was used in place of antistatic resin composition 1 and the dip coating process was used in place of the curtain flow coating process. The antistatic layer in the obtained transparent antistatic layer-coated substrate had a refractive index of 1.57. Calculation of the thickness d of the antistatic layer in accordance with equation (1), n representing 1, gave a thickness of 260 nm. The measurement of the thickness gave the same value of 260 nm. The results of the evaluation of the obtained transparent antistatic layer coated substrate are shown in Table 4.

Comparative Examples 3 and 4

The same procedures as those conducted in Example 1 were conducted except that antistatic resin compositions 9 to 10 were used in place of antistatic resin composition 1 and a transparent sheet of an acrylic resin having a thickness of 2.0 mm (trade name: ACRYACE E; manufactured by JAPAN ACRYACE Co., Ltd.) was used in place of the transparent sheet of a copolymer of methyl methacrylate and styrene. The results of the evaluation are shown in Table 5.

Example 7

Both faces of the antistatic layer-coated substrate prepared in Example 6 were coated with a fluorine compound having hydroxyl group in accordance with the dip coating process. The coating layers were dried at the room temperature for 30 minutes and then heat cured at 85° C. for 1 hour. The results of the evaluation of the obtained optical article are shown in Table 6.

Example 8

The same procedures as those conducted in Example 7 were conducted except that the thickness of the antistatic layer was adjusted to 440 nm. The results of the evaluation of the obtained optical article are shown in Table 6.

Example 9

The same procedures as those conducted in Example 7 were conducted except that the thickness of the antistatic layer was adjusted to 1,000 nm. The results of the evaluation of the obtained optical article are shown in Table 6.

Comparative Example 5

The same procedures as those conducted in Example 7 were conducted except that antistatic resin composition 11 was used in place of antistatic resin composition 6. The results of the evaluation of the obtained optical article are shown in Table 6.

Comparative Example 6

The same procedures as those conducted in Example 7 were conducted except that antistatic resin composition 12 was used in place of antistatic resin composition 6. The results of the evaluation of the obtained optical article are shown in Table 6.

TABLE 4

| Example | 1 | 2 | 3 | 4 | 5 | 6 |
|---|---|---|---|---|---|---|
| Antistatic resin composition | 1 | 2 | 3 | 4 | 5 | 6 |
| Substrate | MS | MS | MS | MS | MS | MS |
| Before test at high temperature and high humidity | | | | | | |
| hardness | H | H | H | HB | HB | HB |
| solvent resistance | good | good | good | good | good | good |
| adhesion | 100/100 | 100/100 | 100/100 | 100/100 | 100/100 | 100/100 |
| total light transmittance (%) | 88.7 | 88.7 | 85.3 | 90.3 | 84.9 | 87.5 |
| haze value (%) | 1.2 | 0.6 | 1.0 | 1.4 | 0.6 | 0.6 |
| surface resistance (Ω) | $6 \times 10^{13}$ | $7 \times 10^{12}$ | $3 \times 10^{9}$ | $9 \times 10^{13}$ | $4 \times 10^{13}$ | $2 \times 10^{12}$ |
| After test at high temperature and high humidity | | | | | | |
| adhesion | 100/100 | 100/100 | 100/100 | 100/100 | 100/100 | 100/100 |
| total light transmittance (%) | 88.7 | 88.5 | 85.3 | 89.9 | 84.9 | 87.5 |
| haze value (%) | 1.4 | 0.8 | 1.2 | 1.6 | 0.8 | 0.7 |
| surface resistance (Ω) | $1 \times 10^{13}$ | $3 \times 10^{12}$ | $2 \times 10^{9}$ | $6 \times 10^{13}$ | $2 \times 10^{13}$ | $1 \times 10^{12}$ |

Note MS: a copolymer of methyl methacrylate and styrene

TABLE 5

| Comparative Example | 1 | 2 | 3 | 4 |
|---|---|---|---|---|
| Antistatic resin composition | 7 | 8 | 9 | 10 |
| Substrate | MS | MS | PMMA | PMMA |
| Before test at high temperature and high humidity | | | | |
| hardness | H | HB | 3H | 3H |
| solvent resistance | good | good | good | good |
| adhesion | 100/100 | 100/100 | 100/100 | 100/100 |
| total light transmittance (%) | 90.1 | 82.5 | 81.3 | 78.5 |
| haze value (%) | 1.8 | 2.4 | 1.6 | 3.4 |
| surface resistance ($\Omega$) | $1 \times 10^{15}$ | $2 \times 10^8$ | $4 \times 10^{15}$ | $7 \times 10^9$ |
| After test at high temperature and high humidity | | | | |
| adhesion | 100/100 | 100/100 | 100/100 | 100/100 |
| total light transmittance (%) | 89.7 | 83.5 | 81.9 | 81.3 |
| haze value (%) | 2.4 | 2.8 | 1.8 | 3.6 |
| surface resistance ($\Omega$) | $1 \times 10^{15}$ | $2 \times 10^8$ | $5 \times 10^{15}$ | $5 \times 10^9$ |

Note MS: a copolymer of methyl methacrylate and styrene
PMMA: polymethyl methacrylate

TABLE 6

| Example | 7 | 8 | 9 | | |
|---|---|---|---|---|---|
| Comparative Example | | | | 5 | 6 |
| Antistatic resin composition | 6 | 6 | 6 | 11 | 12 |
| Substrate | MS | MS | MS | MS | MS |
| Antistatic layer | | | | | |
| thickness (nm) | 260 | 440 | 1,000 | 260 | 260 |
| refractive index | 1.57 | 1.57 | 1.57 | 1.60 | 1.59 |
| Layer containing fluorine compound | | | | | |
| thickness (nm) | 100 | 100 | 100 | 100 | 100 |
| Before test at high temperature and high humidity | | | | | |
| total light transmittance (%) | 96.0 | 95.3 | 91.4 | 97.0 | 96.3 |
| haze value (%) | 1.0 | 1.1 | 0.6 | 0.3 | 0.3 |
| surface resistance ($\Omega$) | $5 \times 10^{12}$ | $6 \times 10^{12}$ | $5 \times 10^{12}$ | $3 \times 10^{14}$ | $6 \times 10^{12}$ |
| wear resistance | good | good | good | good | good |
| reflection (%) | 1.2 | 1.4 | 2.0 | 0.9 | 1.1 |
| After test at high temperature and high humidity | | | | | |
| total light transmittance (%) | 96.3 | 93.2 | 92.6 | 98.1 | 97.0 |
| haze value (%) | 1.9 | 1.8 | 1.7 | 3.2 | 2.1 |
| wear resistance | good | good | good | poor | poor |

Note MS: a copolymer of methyl methacrylate and styrene

What is claimed is:

1. A transparent antistatic layer-coated substrate comprising a transparent substrate and an antistatic layer which comprises 20 to 70% by weight of conductive zinc antimonate and is disposed on at least one face of the transparent substrate, wherein the antistatic layer is formed by photocuring a composition comprising (A) an expoy (meth) acrylate prepared by a reaction between a (meth)acrylate compound having an active hydrogen atom with a compound having two or more glycidyl groups, (B) conductive zinc antimonate and (C) a photopolymerization initiator.

2. A transparent antistatic layer-coated substrate according to claim 1, wherein the epoxy (meth)acrylate has a refractive index of 1.54 or more.

3. A transparent antistatic layer-coated substrate according to claim 1, wherein the transparent substrate comprises a copolymer of methyl methacrylate and styrene.

4. A transparent antistatic layer-coated substrate according to claim 1, wherein the photopolymerization initiator is a compound derived from α-aminoacetophenone.

5. A transparent antistatic layer-coated substrate according to claim 1, wherein the antistatic layer has a refractive index of 1.56 or more.

6. A transparent antistatic layer-coated substrate according to claim 5, wherein a thickness d of the antistatic layer satisfies following equation (1):

$$d = 1/(4n_a) \times \lambda \times (2n+1) \qquad (1)$$

wherein $n_a$ represents a refractive index of the antistatic layer, $\lambda$ represents a wave length used for designing the antistatic layer and is in a range of 530 to 570 nm and n represents 1 or 2.

7. A transparent antistatic layer-coated substrate according to claim 6, further comprising a 70 to 110 nm thick layer comprising a fluorine compound having hydroxyl group is disposed on the antistatic layer.

* * * * *